US009961675B1

(12) United States Patent
Reed et al.

(10) Patent No.: US 9,961,675 B1
(45) Date of Patent: May 1, 2018

(54) MULTI-LAYER CONTROL PLANE AUTOMATIC RESOURCE ALLOCATION SYSTEM

(71) Applicant: AT&T Intellectual Property I, L.P., Atlanta, GA (US)

(72) Inventors: Caleb Reed, Lenexa, KS (US); David Irvin, Lawrence, KS (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days. days.

(21) Appl. No.: 15/605,155

(22) Filed: May 25, 2017

(51) Int. Cl.
*H04W 72/00* (2009.01)
*H04W 72/04* (2009.01)
*H04L 29/06* (2006.01)
*H04L 12/24* (2006.01)
*H04W 88/12* (2009.01)

(52) U.S. Cl.
CPC ......... *H04W 72/0406* (2013.01); *H04L 41/20* (2013.01); *H04L 65/10* (2013.01); *H04W 88/12* (2013.01)

(58) Field of Classification Search
CPC ................................................ H04W 72/0406
USPC ...................................................... 455/452.1
See application file for complete search history.

(56) References Cited

U.S. PATENT DOCUMENTS

| | | |
|---|---|---|
| 7,069,291 B2 | 6/2006 | Graves |
| 8,203,965 B1 | 6/2012 | Vijendra et al. |
| 8,601,534 B2 | 12/2013 | Schiffman et al. |
| 8,650,298 B2 | 2/2014 | Daly et al. |
| 8,826,277 B2 | 9/2014 | Chang et al. |
| 8,997,107 B2 | 3/2015 | Jain |
| 9,038,068 B2 | 5/2015 | Engle et al. |
| 9,251,033 B2 | 2/2016 | Kirchhofer |
| 9,288,158 B2 | 3/2016 | Boss et al. |
| 9,313,133 B2 | 4/2016 | Yeddanapudi et al. |
| 9,329,904 B2 | 5/2016 | Wray et al. |
| 9,329,909 B1 | 5/2016 | Khanna et al. |
| 9,424,024 B2 | 8/2016 | Kannan et al. |
| 9,465,630 B1 | 10/2016 | Muniz et al. |
| 9,473,567 B2 | 10/2016 | Parikh et al. |

(Continued)

FOREIGN PATENT DOCUMENTS

| | | |
|---|---|---|
| TW | 201419161 A | 5/2014 |
| WO | WO 2013/037619 A1 | 3/2013 |

(Continued)

OTHER PUBLICATIONS

Copil et al.; "On Controlling Elasticity of Cloud Applications in CLEAR"; Emerging Research in Cloud Distributed Computing Systems; 2015; p. 222-252.

(Continued)

*Primary Examiner* — Joel Ajayi
(74) *Attorney, Agent, or Firm* — Baker & Hostetler LLP

(57) ABSTRACT

An automatic allocation system for a network, the automatic allocation system comprising a controller, the controller defining a control plane that provides a common language to communicate with each OSI layer within the network, the controller further is in communication with at least one data source, the at least one data source including real time performance data for the network, wherein the controller monitors the real time performance data to identify an allocation need, wherein the controller adds or removes at least one of a physical resource, a network device, a virtual instance and a virtual network function based on the allocation need.

14 Claims, 12 Drawing Sheets

(56) References Cited

U.S. PATENT DOCUMENTS

| | | |
|---|---|---|
| 9,477,503 B2 | 10/2016 | Masuda et al. |
| 9,590,875 B2 | 3/2017 | Assuncao et al. |
| 9,594,585 B2 | 3/2017 | Uchikawa et al. |
| 9,600,312 B2 | 3/2017 | Wagner |
| 2009/0263129 A1 | 10/2009 | Draer et al. |
| 2013/0232193 A1 | 9/2013 | Ali et al. |
| 2015/0295750 A1 | 10/2015 | Blanco et al. |
| 2015/0350108 A1 | 12/2015 | Baughman et al. |
| 2016/0057234 A1 | 2/2016 | Parikh et al. |
| 2016/0261522 A1 | 9/2016 | Hanis et al. |
| 2016/0315809 A1 | 10/2016 | McMurry et al. |
| 2016/0378519 A1 | 12/2016 | Gaurav et al. |
| 2017/0024787 A1 | 1/2017 | Mathew et al. |

FOREIGN PATENT DOCUMENTS

| | | |
|---|---|---|
| WO | WO 2013/185175 A1 | 12/2013 |
| WO | WO 2016/155835 A1 | 10/2016 |
| WO | WO 2017/000628 A1 | 1/2017 |
| WO | WO 2017/045576 A1 | 3/2017 |

OTHER PUBLICATIONS

Ali-Eldin et al.; "An Adaptive Hybrid Elasticity Controller for Cloud Infrastructures"; IEEE Network Operations and Management Symposium; 2012; p. 204-212.

Da Rosa Righi et al.; "Towards Cloud-based Asynchronous Elasticity for Iterative HPC Applications"; Journal of Physics: Conf. Series vol. 649 No. 1; 2015; 19 pages.

Lim et al.; "Automated Control for Elastic Storage"; ACM Proceedings of the $7^{th}$ Int'l Conf. on Autonomic Computing; 2010; 10 pages.

Gong et al.; "PRESS: Predictive Elastic ReSource Scaling for cloud systems"; Int'l Conf. Network and Service Management; 2010; 8 pages.

Gambi et al.; "On Estimating Actuation Delays in Elastic Computing Systems"; IEEE Software Engineering for Adaptive and Self-Managing Systems; 2013; p. 33-42.

Martin Sunal; "Container service chaining"; FRINX; 45 pages.

MULTI-LAYER CONTROL PLANE AUTOMATIC RESOURCE ALLOCATION SYSTEM

TECHNICAL FIELD

This disclosure relates generally to network management and, more specifically, to a multi-layer control plane that provides a common platform for controlling and orchestrating different and potentially unrelated network appliances. More particularly, the disclosure relates to an automatic resource allocation system that includes a controller that communicates with network appliances to detect link exhaust or other performance issues and allocates resources and provides provisioning orders for additional equipment if needed.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual computer processing units (vCPUs), and network interfaces or network interface cards (NICs). Determining how to assign these resources among VMs in an efficient manner may be unbearably complex.

Most networking appliances have a single use case and all decisions are made within the appliance with little to no input from other sources. However, software defined networks (SDN) and network function virtualization (NFV) seek to change that. Networking appliances will run virtually on generic boxes and their functions will be controlled by an orchestrator. The orchestrator however, is specific to the network function it controls. For example, an orchestrator that spins up servers based on demand can't trigger a circuit, or establish a transport path if bandwidth exhaust is reached and things like quality of service (QoS) and service level agreement (SLA) management are left to switches and routers. Currently, most of the decisions are made by network engineers and require a hands on approach to provision additional network resources. In many cases, adding capacity may take days as equipment usually has to be ordered. Lastly, some of the existing automatically scaling services are ultimately limited by the maximum port speed on the layer 1-3 appliances in use (100 Mbps or 1 Gbps in most cases today).

This disclosure is directed to solving one or more of the problems in the existing technology.

SUMMARY

According to an example, the disclosure generally provides an automatic allocation system for a network, the automatic allocation system comprising a controller, the controller defining a control plane that provides a common language to communicate with each OSI layer within the network, the controller further is in communication with at least one data source, the at least one data source including real time performance data for the network, wherein the controller monitors the real time performance data to identify an allocation need, wherein the controller adds or removes at least one appliance based on the allocation need. According to a further example, the at least one appliance is a physical appliance or an appliance implemented through a virtual function. According to still a further example, the at least one appliance is at least one of a physical resource, a network device, a virtual instance and a virtual network function based on the allocation need. According to another example, the physical resource is a processor, a memory, an input/output device, or a storage data drive.

Still another example includes A network device in a network, the network device comprising: a processor, an input/output device coupled to the processor, and a memory coupled with the processor, the memory comprising executable instructions that when executed by the processor cause the processor to effectuate operations comprising: generating a controller in communication with at least one layer of the network, linking the controller to at least one data source, wherein the data source provides at least real time performance data for the network; detecting current network capacity and current network usage from the performance data; comparing current network capacity and current network usage to determine an allocation need; automatically adding or removing an appliance.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
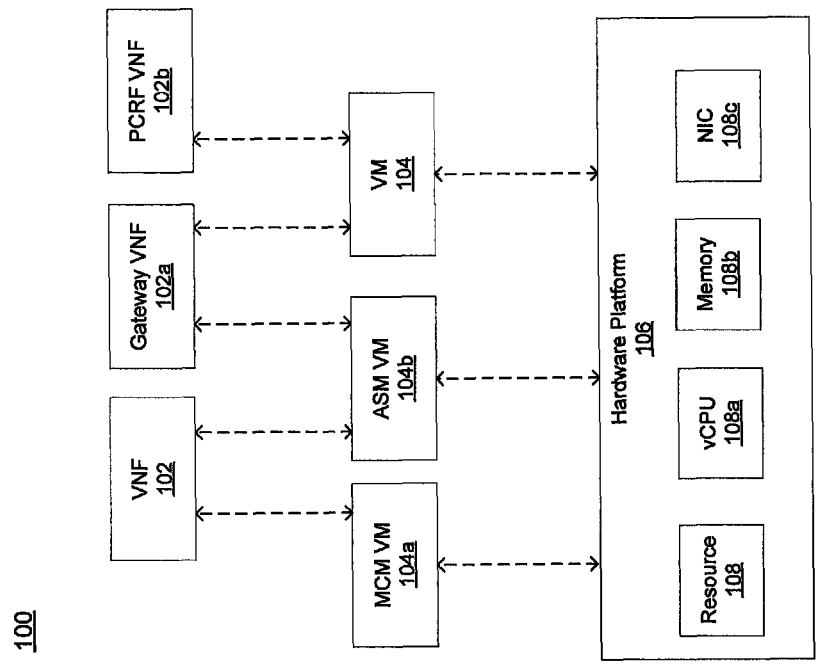
FIG. 1A is a representation of an exemplary network.

FIG. 1A is a representation of an exemplary network 100. Network 100 may comprise a software defined network or SDN—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs. Each VNF 102 may use one or more virtual machine (VM) 104 to operate. Each VM 104 may have a VM type that indicates its functionality or role. For example, FIG. 1A illustrates a management control module (MCM) VM 104a and an advanced services module (ASM) VM 104b. Additionally or alternatively, VM 104 may include other types of VMs. Each VM 104 may consume various network resources from a hardware platform 106, such as a resource 108, a virtual central processing unit (vCPU) 108a, memory 108b, or a network interface card (MC) 108c. Additionally or alternatively, hardware platform 106 may include other types of resources 108.

Figure 1B:
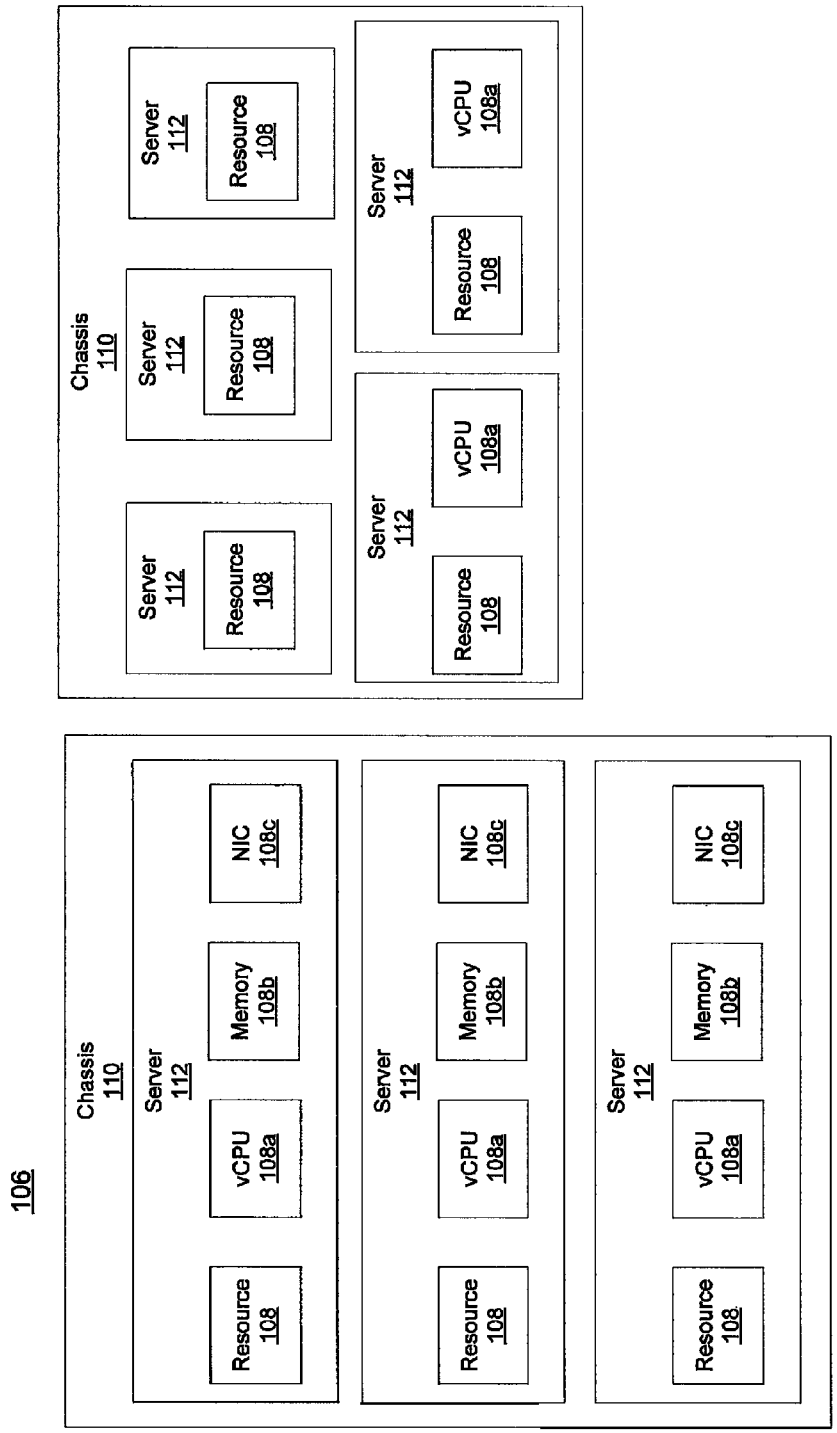
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same server 112 or set of servers 112. For example, if VM 104 uses eight vCPUs 108a, 1 GB of memory 108b, and 2 NICs 108c, the rules may require that all of these resources 108 be sourced from the same server 112. Additionally or alternatively, VM 104 may require splitting resources 108 among multiple servers 112, but such splitting may need to conform to certain restrictions. For example, resources 108 for VM 104 may be able to be split between two servers 112. Default rules may apply. For example, a default rule may require that all resources 108 for a given VM 104 must come from the same server 112.

According to the example, an automatic allocation system according to the disclosure includes a controller defining a multi-layer control plane established to communicate with network appliances at all levels of the open system interconnection (OSI) model. If controller detects link exhaust, it will either trigger another circuit, claim part of an open circuit, or shift traffic to an underutilized part of the network. Controller will then analyze server traffic served by that link and determine if another server instance is needed to handle the increased load. The thresholds at which another link or server instance is needed can be set, via an input device, by the customer, network engineers or the decision may be based on historical usage statistics. If equipment needs to be ordered, the controller will copy existing details, assign the new circuit to the next available ports, and send the information to a purchase order system for automated ordering. Controller may further schedule link turn up by sending a notice to technicians at the customer location and/or in the central office. In this situation, additional capacity is delivered instantaneously with minimal human interaction. The circuit order can also "fallout" to a Network or outside plant (OSP) planner/engineer if the system can't find a spare path. This would most likely happen in situations where spare fiber isn't available preventing circuit turn up. Additionally, usage data collected by the controller can be analyzed and recommendations can be made to the end user. Controller will also be able to identify faults at any layer quickly and redirect traffic as needed. While a single controller is described, it will be understood that multiple controllers may be implemented across internet service providers (ISPs) to provide an even greater level of autonomy.

Figure 2:
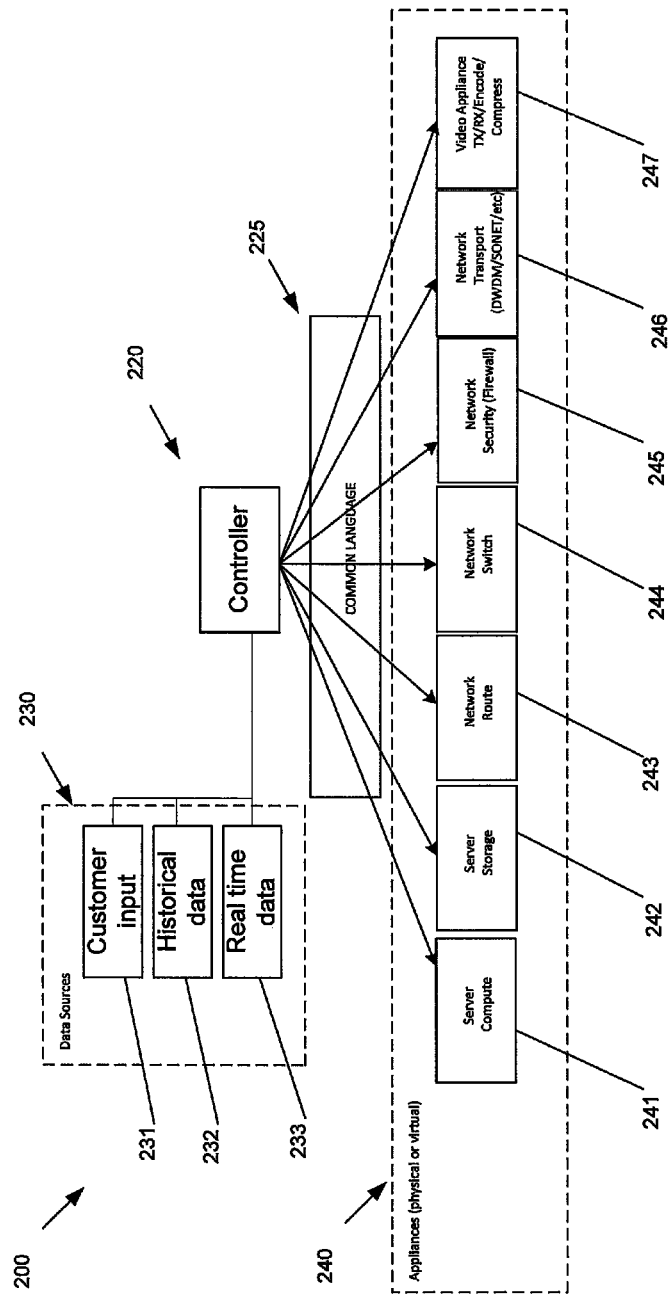
FIG. 2 is a representation of an automatic resource allocation system according to an example.

With reference to the example shown in FIG. 2, an automatic allocation system 200 includes a controller 220 that defines a multilayer control plane and is able to communicate with network appliances/devices on all levels of the OSI model. The OSI model characterizes communications functions of telecommunication and computing networks and includes plural layers. For example, a physical layer (layer 1), a data link layer (layer 2), a network layer (layer 3), a transport layer (layer 4), a session layer (layer 5), a presentation layer (layer 6), and an application layer (layer 7).

Controller 220 may be implemented as a dedicated physical appliance, or as a network device as described more completely below. Controller 220 is in communication with at least one data source, generally indicated by the number 230 and at least one network appliance, generally indicated by the number 240. According to an example, data source 230 may include at least one of a customer input data source 231, a historical data source 232 and a real time data source 233. The at least one appliance 240 may be a physical appliance or an appliance implemented through a virtual network function. A physical appliance is also referred to as a physical resource herein, and may include but is not limited to hardware supporting the network including but not limited to processors, read only memory, storage data drives, and server hardware. As depicted in FIG. 2, controller 220 defines a control plane 225 using a common language to control unrelated appliances 240 including but not limited to servers, routers, switches, transport devices etc. across all levels of the OSI model. In the depicted example, controller 220 is shown as controlling at least one of a compute server 241, a storage server 242, a network router 243, a network switch 244, a network security element 245, for example, a firewall, a network transport 246, such as a DWDM/SONET etc., and a video appliance 247, such as a TX/RX/Encode/Compress.

Figure 2A:
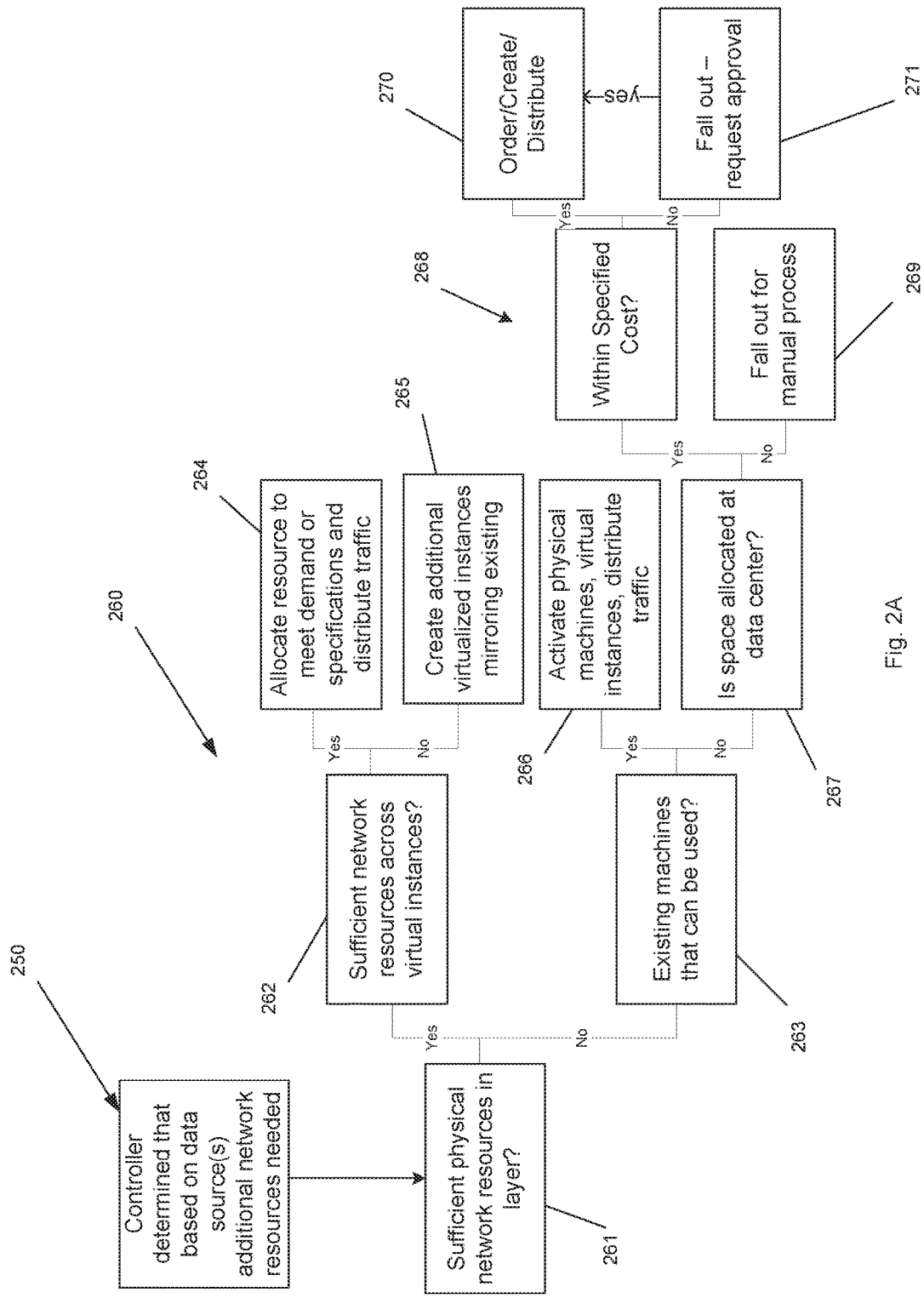
FIG. 2A is a representation similar to FIG. 2 depicting a further example.

With reference to FIG. 2A, one example of an operation of system 200 is shown. As described above, controller 220 is in communication with at least one data source 230. Controller 220 may monitor such data to analyze whether additional resources are needed at step 250. Upon detecting a need for additional resources, controller 220 may allocate resources according to a method generally indicated at 260. In general, controller 220 analyzes the sufficiency of resources at a layer and the resources available to fill the need. For example, at step 261, controller 220 determines whether sufficient physical network resources exist in a layer. If sufficient physical resources exist, controller 220 may further consider whether sufficient network resources exist across virtual instances at step 262. If insufficient physical resources exist in the layer, controller determines whether existing machines may be used at step 263.

If at step 262, sufficient virtual instances are found, controller allocates the resources to meet demand or specifications from data source 230 and distributes traffic at step 264. If insufficient virtual instances are found, controller 220 allocates additional resources by creating virtualized instances at step 265. These instances may mirror existing virtual instances.

If at step 263, existing machines that can be used are found, controller 220 activates physical machines and creates virtual instances with such machines as needed to distribute traffic at step 266. If existing machines are not found, controller 220 determines if space is allocated at a data center at step 267. If sufficient space is allocated within a data center, controller 220 may perform the optional step of considering whether the purchase of additional machines is within a specified cost at step 268. If insufficient space is available in a data center, controller 220 may prompt a user via an input/output device to consider adding space or otherwise reconfiguring hardware and virtual instances at step 269. This step 269 prompts the user to manually provision the network. This process of prompting the user may be referred to as a fall out step.

If sufficient space in data center is detected and upon analyzing the specified cost at step 268, the controller determines that additional machines are within cost, controller 220 may automatically order, create or distribute additional machines or virtual instances to support demand at step 270. If the additional machines or virtual instances are not within a specified cost, controller 220 may perform another fall out step at 271 and prompt a user for approval. Upon receiving an approval input, via input/output device, controller 220 may proceed to order, create or distribute additional machines or virtual instances at step 270.

The process 260 may be performed at each layer to automatically allocate resources. Controller 220 may repeat the process at regular intervals, according to a schedule, or at prompting from a user input or alert generated by monitoring of data source 230. For example, as controller 220 monitors network layers over a period of time, it may identify usage and or outage trends that cause controller to allocate resources preemptively to anticipate increased usage or likely outages. Alternatively or in addition to such allocation, controller 220 may increase the frequency of its monitoring to detect increased traffic or outages requiring reallocation of resources earlier.

As discussed above, controller 220 may analyze information from at least one data source 230 to decide whether an allocation of resources is needed. One data source may be a user input received via an input/output device in communication with controller 220. The input from a user may reflect an immediate need or future need, and controller 220 may use the input to immediately begin consideration of allocation strategies even if the need is a future need. Based on user input, controller 220 may respond via input/output device with a recommended reallocation communication to user. Optionally, controller 220 may consider data from additional data sources 230 in conjunction with the user input data. The data from additional data sources may be used to augment allocation considerations by controller 220 or to provide further reporting on real time performance, trend or historical information in response to user input. Controller may provide such real time performance, trend and historical information as part of its recommendation via input/output device. As shown in FIG. 2, controller may receive historical performance data from a historical data source 232 and real time performance data from a real time data source 233. Controller 220 may create trend data by analyzing historical data 232, or access a trend data resource within available data sources 230. Historical data may show historical usage, failures, outages and the like. Historical data may further include previous allocation strategies. Controller 220 may update historical data by storing its findings with respect to the layer capabilities and usage over time. Controller 220 may also store allocation strategies considered or implemented by controller 220 as historical data 232. By continuously updating the historical data 231, controller 220 provides machine learning from operation of automated allocation system 200. Likewise, controller 220 is able to anticipate needs based on historical data 231 and use historical allocation strategies to add equipment, virtual instances, or redistribute traffic before an incident occurs. For example, controller 220 may observe from historical data that usage increases in response to an event on a regular basis. For example, a retailer network may see increased traffic at certain dates throughout the year, such as holidays, scheduled sales events, and the like. Anticipating these needs, controller 220 can automatically allocate additional equipment, virtual instances, and the like in advance of such dates or on such dates based on historical use data 231.

Controller 220 has the ability to automatically allocate across different layers and perform routing and switching across the country to provide the necessary equipment and instances. Such allocation by controller 220 may be performed automatically, on demand, or with the user ability to opt out after allocation is made. While the discussion above has used the example of allocation in response to a deficiency in resources relative to usage, the same operations can be employed by the controller to scale back equipment and instances based on an overabundance of resources relative to demand. System 200 may use the ability of controller to automatically spin up or tear down resources to provide flexible resource allocation plans to customers that allow their resources to be demand based. In connection with increasing and decreasing allocations, controller 220 may apply a selected lag period before performing an allocation based on real-time demand. For instance, real-time monitoring by controller of use data may show decreasing demand that could cause controller 220 to decrease an allocation. With a selected lag period applied, controller 220 would wait until expiration of the lag period to confirm that demand was still in a decreased state before deallocating resources to meet the decreased demand. The lag period provides a buffer against temporary fluctuations in demand that would cause rapid deallocation and reallocation if acted on immediately. Any lag period may be applied by controller 220 including but not limited to a selected time delay, a delay for one or more billing cycles, or a delay that is tied to a prompt for user input. For the last example, controller 220 would prompt user via input/output device to alert the user to an increase or decrease in demand and ask the user to set a time period at which the allocation should occur. Considering a network allocation as an example, in performing its analysis, controller 220 may determine that the system usage is dropping below the capacity of the available switches or routers in level 1. It may provide an alert to user via input/output device and request authorization to immediately deallocate switches and routers to correspond to demand or prompt user to enter a lag period to give the user the option to keep current resources allocated for the lag period and reconsider the allocation after the lag period expires.

According to the examples, automatic allocation system 200 improves fault tolerance within the network N by providing the ability to redirect traffic around a faulty component by bringing other available resources to bear or by ordering additional resources to replace the faulty component. As discussed above, controller 220 may monitor real time usage and performance data from data source 230. Performance information may be compared against vendor specifications or user defined specifications stored in memory or accessible through data source 230. Periodic monitoring by controller 220 may demonstrate a pattern of performance near a lower limit of operating specifications suggesting that a component is degrading or is faulty triggering controller 220 to recommend replacement or automatically order a replacement. Data source 230 may further include policies that define the specifications for when controller 220 is able to automatically replace a component including but not limited to a budget for replacements, a time of degraded operation, any tolerances that should be applied to factory upper and lower performance range boundaries, and the like.

Figure 3:
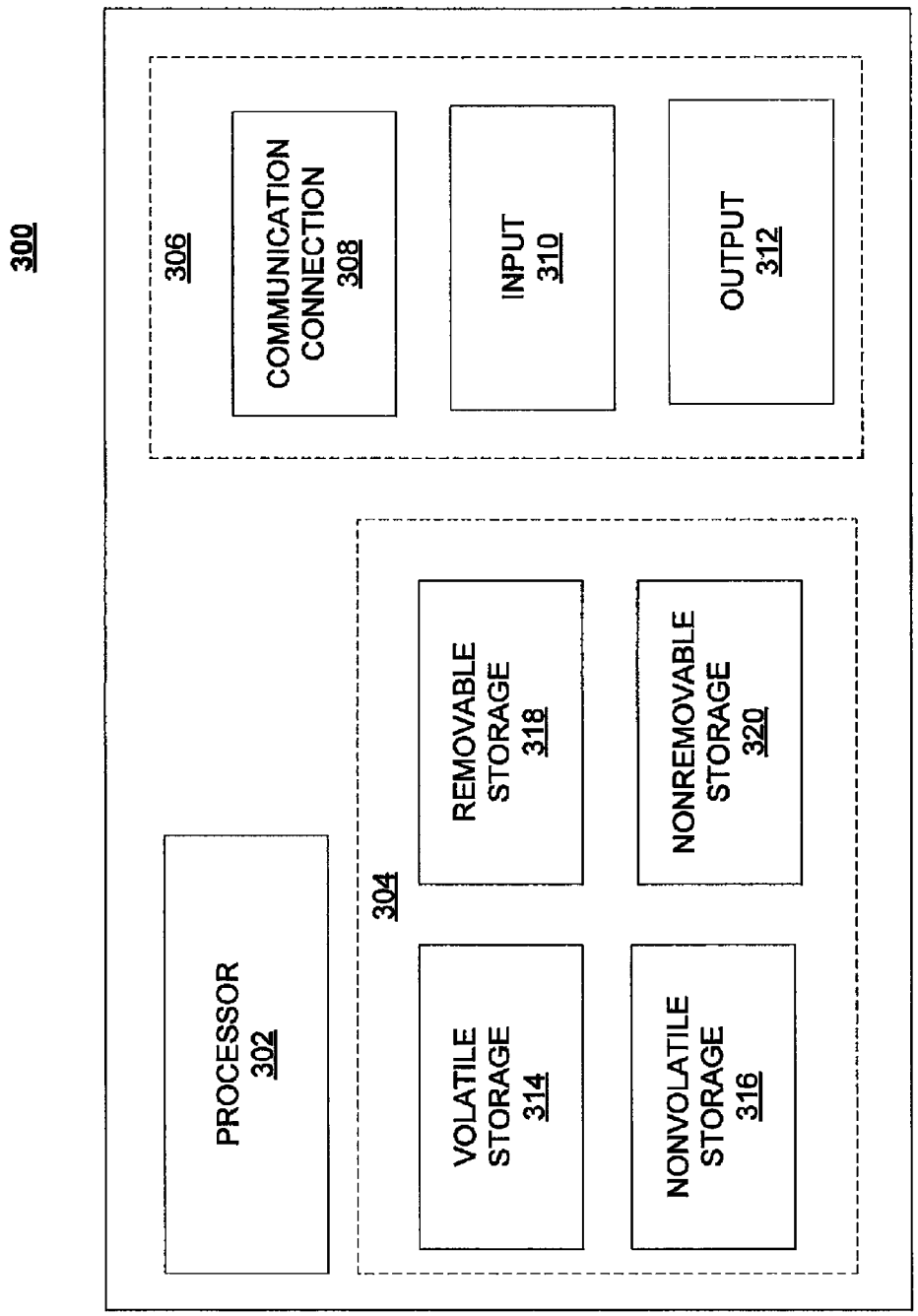
FIG. 3 is a representation of a network device according to an example.

System 200 may be implemented in a network device. FIG. 3 illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with automatic allocation of resources as discussed above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for automatically allocating resources, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to automatically allocate resources.

An automatic resource allocation system 200 may reside within any network to improve fault tolerance through the allocation of resources. The following are example networks on which system 200 may reside. For purposes of centrality, system 200 may reside within a core network shown in the various examples below. However, it will be understood that system 200 may reside on any network edge router or network device providing the same function in connection with customer VRFs including but not limited to telecommunications networks, internet, and other networks described more completely below.

Figure 4:
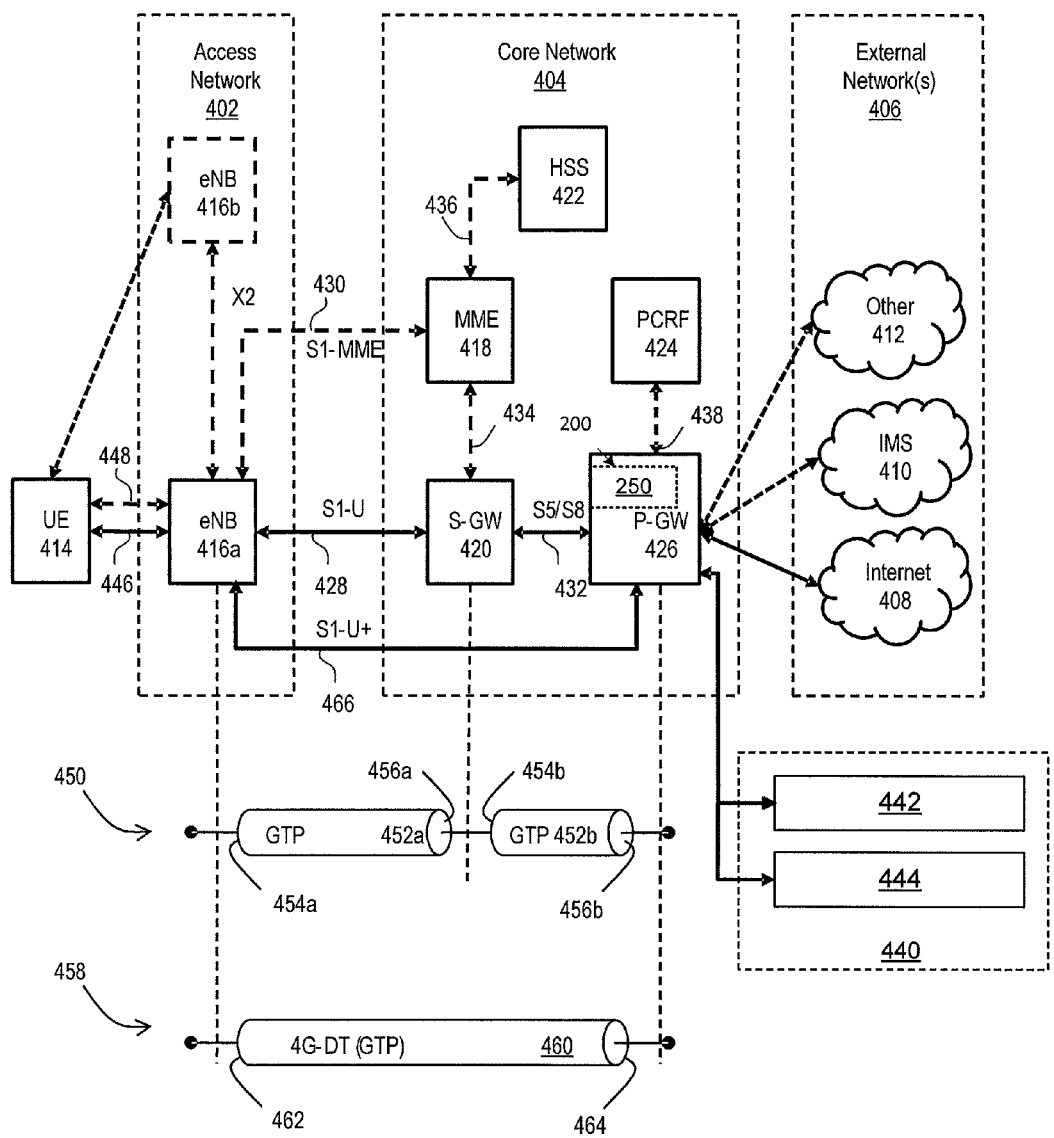
FIG. 4 depicts an exemplary communication system that provides wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., SI signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
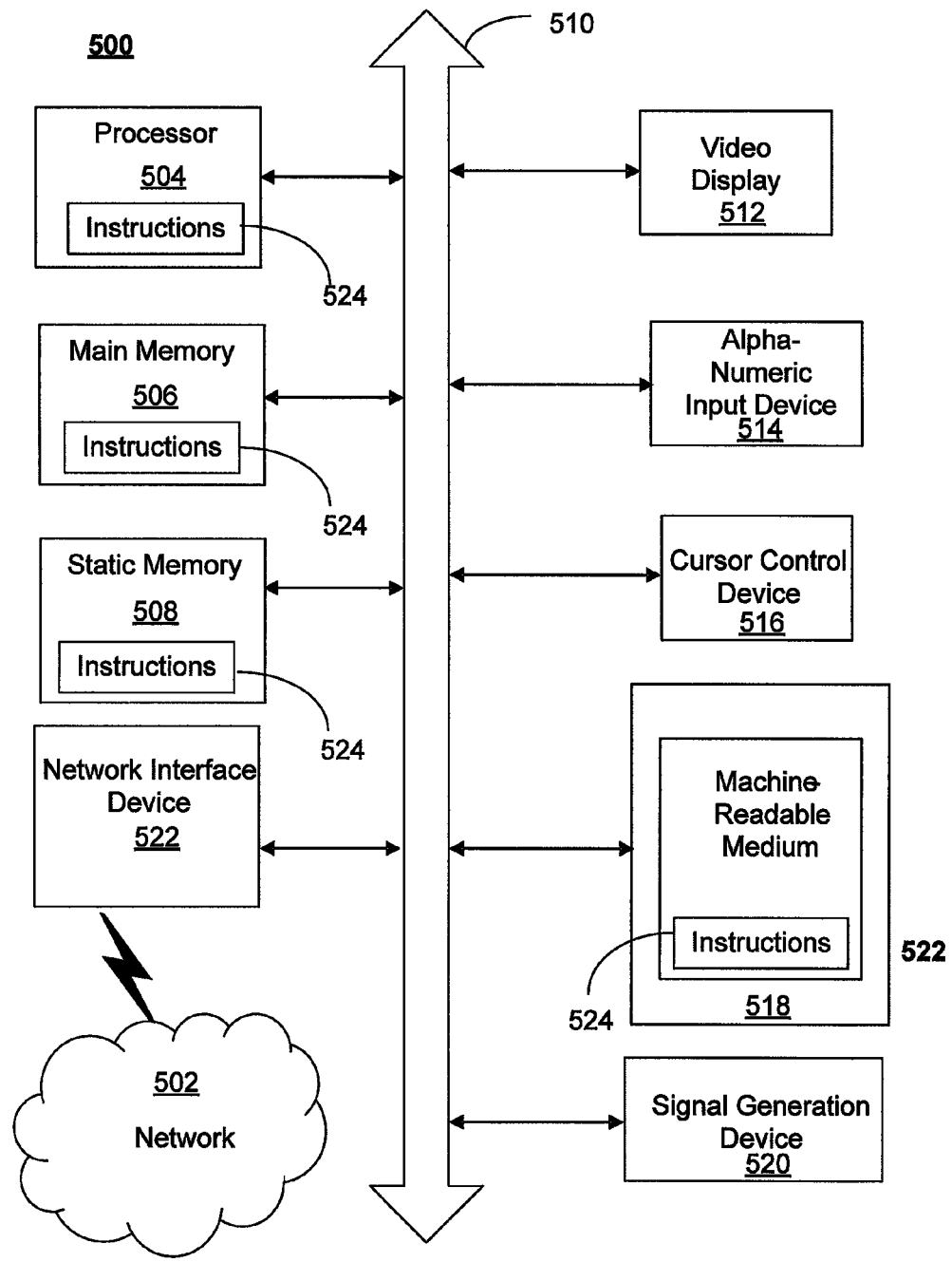
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
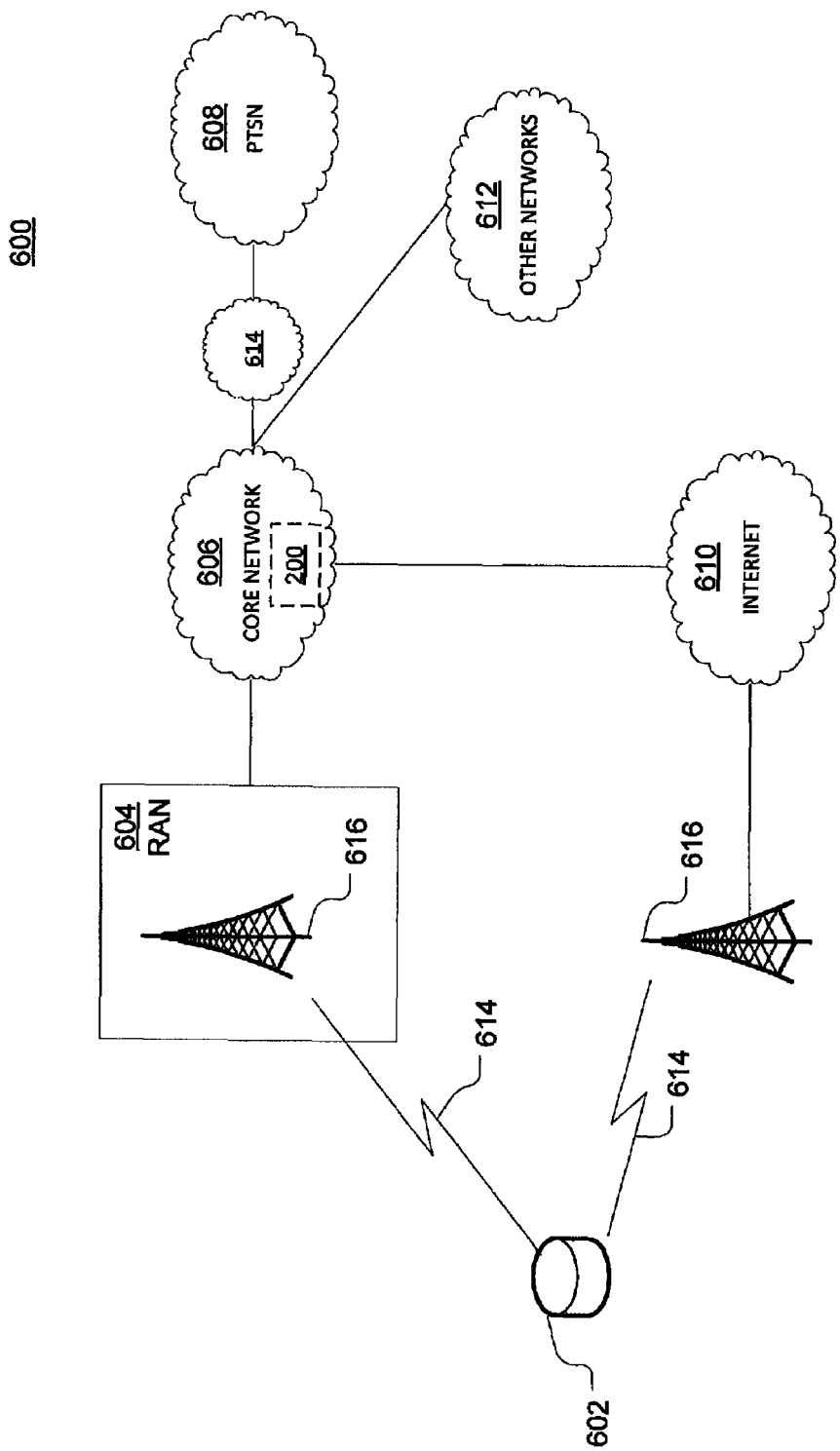
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements, such as a base station controller (BSC), a radio network controller (RNC), or relay nodes. One or more base stations 616 may be configured to transmit or receive wireless signals within a particular geographic region, which may be referred to as a cell. The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
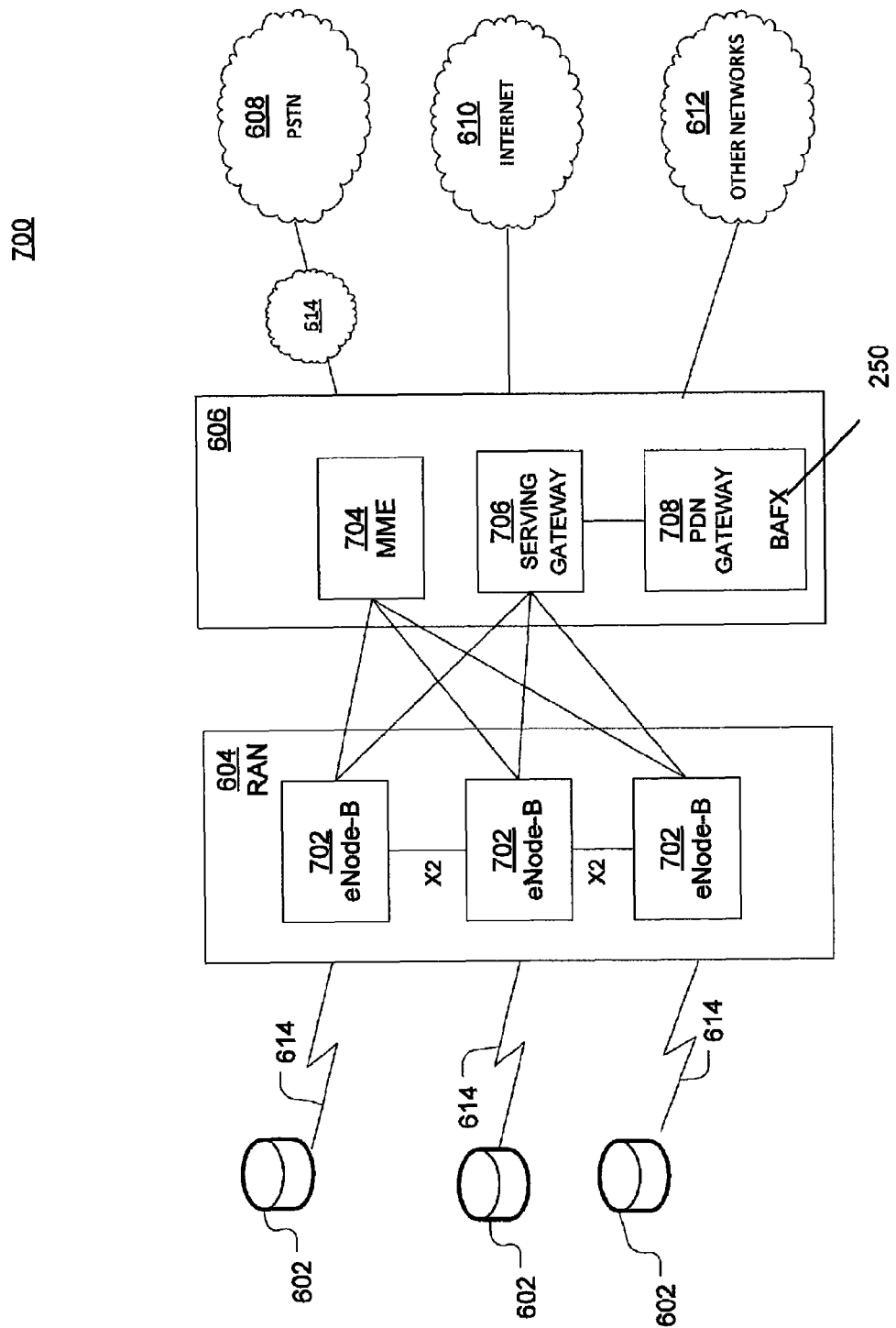
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
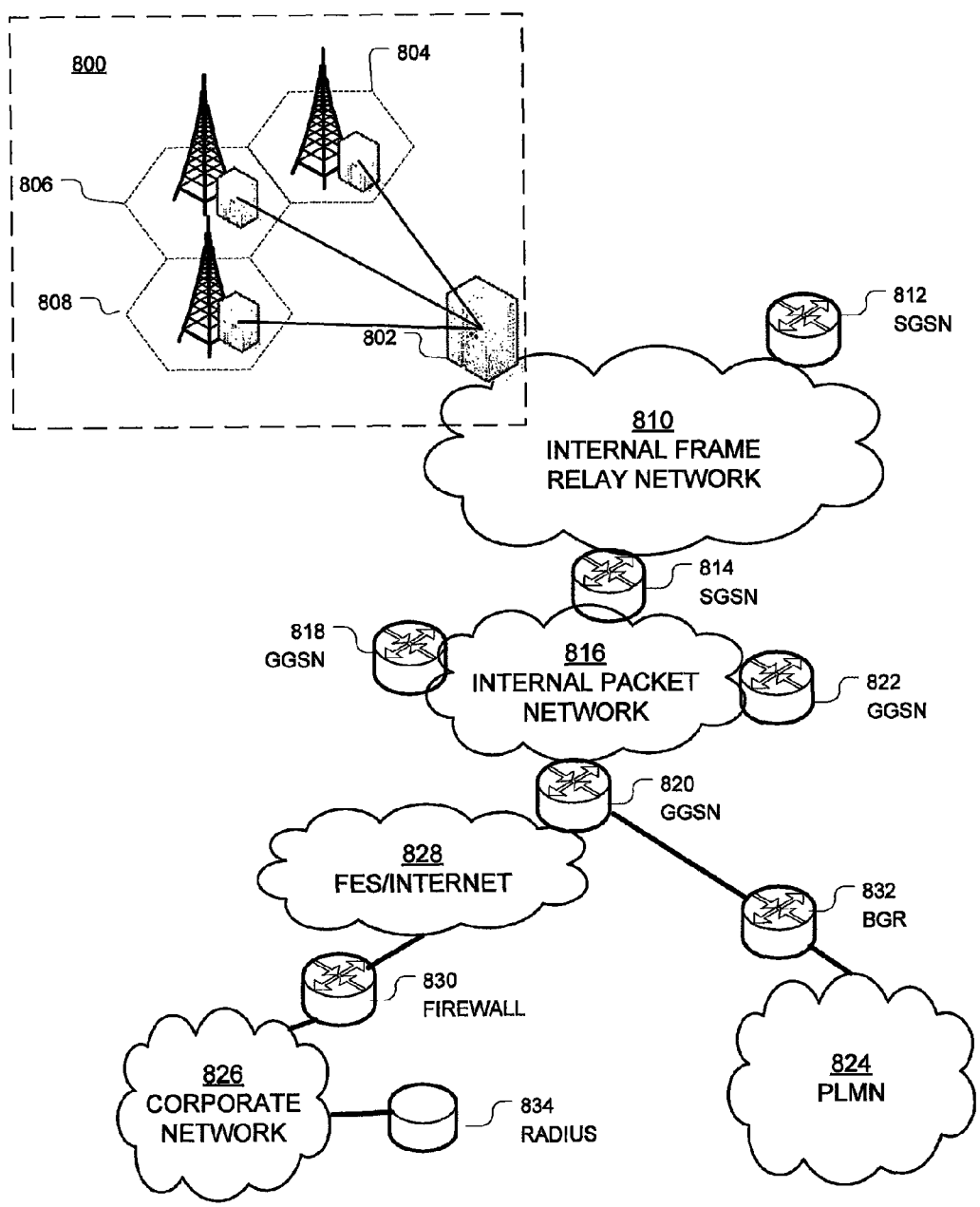
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
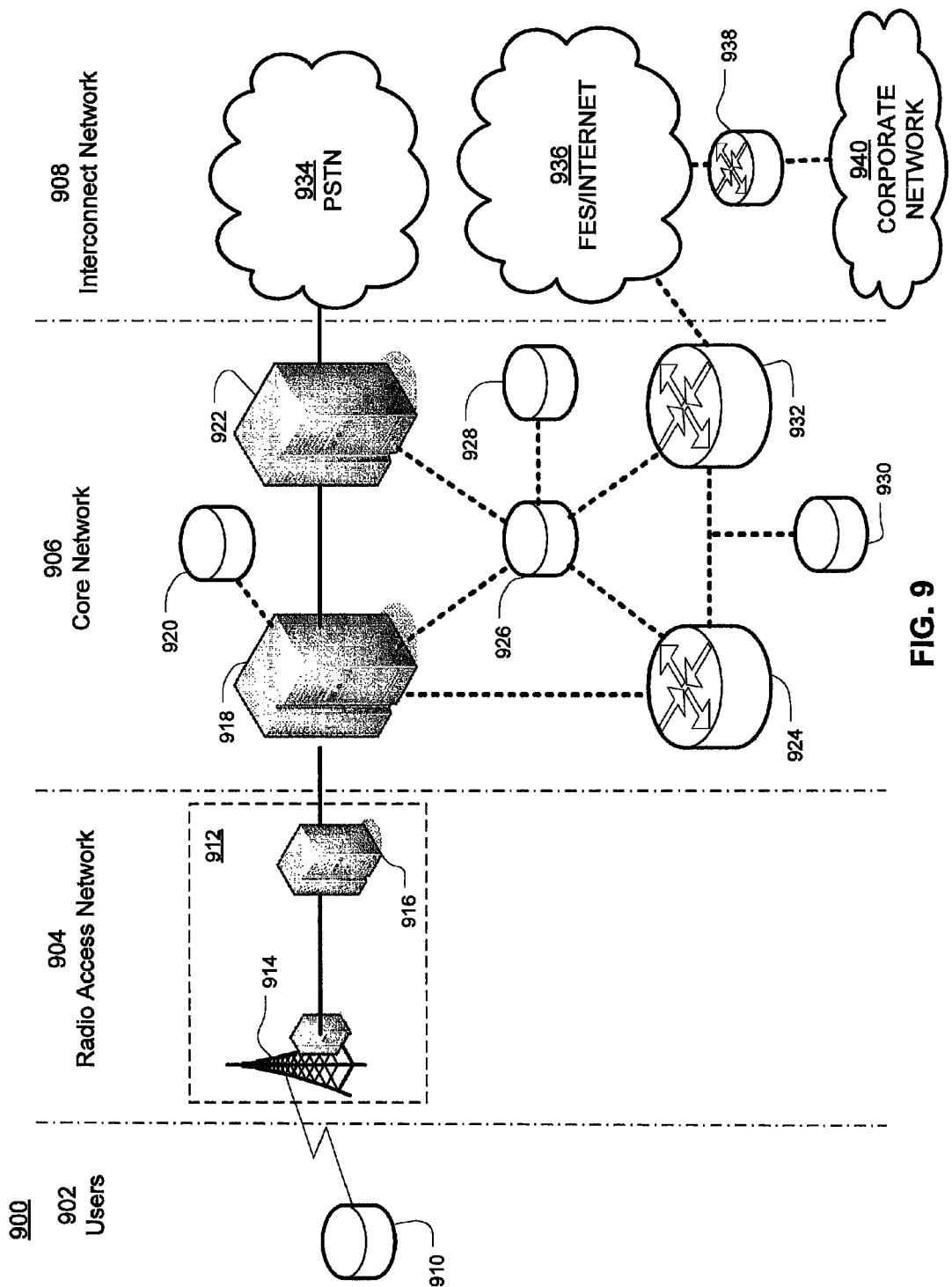
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
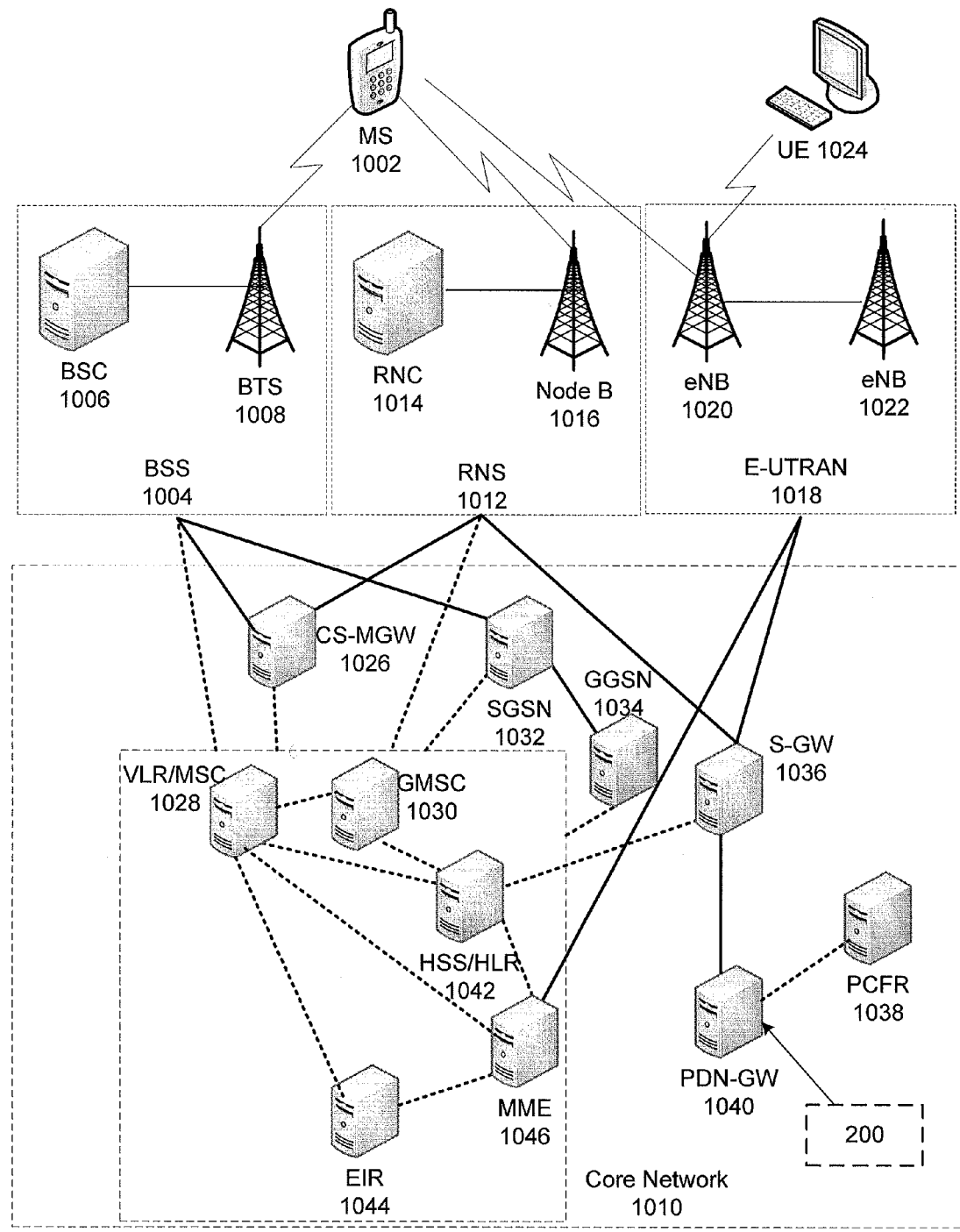
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1

An automatic allocation system for a network, the automatic allocation system comprising a controller, the controller defining a control plane that provides a common language to communicate with each OSI layer within the network, the controller further is in communication with at least one data source, the at least one data source including real time performance data for the network, wherein the controller monitors the real time performance data to identify an allocation need, wherein the controller adds or removes at least one appliance.

Example 2

The system of example 1, wherein the appliance is at least one of a physical resource, a network device, a virtual instance and a virtual network function based on the allocation need.

Example 3

The system of example 1 further comprising a memory, the controller being configured to store allocation data in the memory.

Example 4

The system of example 1, wherein the controller is in communication with at least one of a compute server, a storage server, a network route, a network switch, a network security, a network transport and a video appliance.

Example 5

The system of example 1, wherein the at least one data source includes a historical data source, the historical data source including at least historical performance data for the network.

Example 6

The system of example 1, wherein the at least one data source further comprises a customer input data store.

Example 7

The system of example 6, wherein the customer input data store is in communication with an input/output device associated with the controller, and wherein the customer input data store stores at least one input from the input/output device.

Example 8

The system of example 1, wherein the controller is configured to communicate with a network resources layer to determine if sufficient physical resources exist in the network resource layer, wherein if controller detects sufficient physical resources, controller determines whether sufficient virtual instances exist, wherein if controller detects sufficient virtual instances exist, controller allocates the virtual instances to meet demand, and wherein if controller detects insufficient virtual instances, controller creates additional virtual instances.

Example 9

The system of example 8, wherein if the controller detects insufficient physical resources, the controller determines whether existing physical resources can be used to meet demand, and if the controller determines that existing physical resources can be used, the controller activates at least one of the existing physical resources to meet demand.

Example 10

The system of example 9, wherein if the controller determines that the existing physical resources cannot be used to address the allocation need, the controller is configured to access the at least one data source and determine whether sufficient space is allocated in a data center associated with the network to add at least one additional physical resource.

Example 11

The system of example 10, wherein the controller is configured to access the at least one data source to determine if a purchase of at least one additional resource is within a specified cost, and if the purchase of at least one additional resource is within a specified cost, the controller is configured to order the at least one additional physical resource.

Example 12

A network device in a network, the network device comprising: a processor, an input/output device coupled to the processor, and a memory coupled with the processor, the memory comprising executable instructions that when executed by the processor cause the processor to effectuate operations comprising: generating a controller in communication with at least one layer of the network, linking the controller to at least one data source, wherein the data source provides at least real time performance data for the network; detecting current network capacity and current network usage from the performance data; comparing current network capacity and current network usage to determine an allocation need; automatically adding or removing an appliance.

Example 13

The network device of example 12, wherein the appliance is at least one of a physical resource, a network device, a virtual instance, and a virtual network function on the network based on the allocation need.

Example 14

The network device of example 12, wherein before or during the step of automatically adding or removing, the controller is configured to communicate with a network resources layer to determine if sufficient physical resources exist in the network resource layer, wherein if the controller detects sufficient physical resources, the controller determines whether sufficient virtual instances exist, wherein if the controller detects sufficient virtual instances exist, the controller allocates at least one of the virtual instances to address the allocation need, and wherein if the controller detects insufficient virtual instances, the controller creates at least one additional virtual instance based on the allocation need.

Example 15

The network device of example 13, wherein the controller creates the at least one additional virtual instance mirroring at least one existing virtual instance.

Example 16

The network device of example 13, wherein if the controller detects insufficient physical resources are active, the controller determines whether existing physical resources can be used, and if the controller determines that existing physical resources can be used, the controller activates at least one of the existing physical resources to address the allocation need.

Example 17

The network device of example 13, wherein if the controller determines that insufficient physical resources exist in the network resource layer to address the allocation need, the controller determines whether sufficient space is allocated in a data center associated with the network to add at least one additional physical resource based on the allocation need.

Example 18

The network device of example 16, wherein the controller is configured to access the at least one data source to determine if a purchase of at least one additional resource is within a specified cost, and if the purchase of at least one additional resource is within a specified cost, the controller is configured to order the at least one additional physical resource.

Example 19

The network device of example 12, wherein the processor further effectuates operations comprising before the step of adding or reducing, sending a prompt to the input/output device including the proposed allocation and a request for confirmation of the allocation, and performing the adding or reducing step only after the input/output device returns a confirmation of the allocation.

Example 20

The network device of example 12, wherein the processor further effectuates operations comprising linking the controller to at least one of a compute server, a storage server, a network route, a network switch, a network security, a network transport and a video appliance.

The invention claimed is:

1. An automatic allocation system for a network, the automatic allocation system comprising: a controller, the controller defining a control plane that provides a common language to communicate with every OSI layer within the network, the controller further is in communication with at least one data source, the at least one data source including real time performance data for the network;
   wherein the controller monitors the real time performance data to identify an allocation need, wherein the controller adds or removes at least one appliance, the appliance includes a physical resource, wherein the physical resource is hardware supporting the network;
   wherein the controller is configured to communicate with a network resources layer to determine when sufficient physical resources exist in the network resource layer; and
   when the controller detects insufficient physical resources, the controller determines whether existing physical resources can be used to meet demand, and when the controller determines that existing physical resources can be used, the controller activates at least one of the existing physical resources to meet demand;
   when the controller determines that the existing physical resources cannot be used to address the allocation need, the controller is configured to access the at least one data source and determine whether sufficient space is allocated in a data center associated with the network to add at least one additional physical resource; and
   wherein the controller is configured to access the at least one data source to determine that a purchase of at least one additional resource is within a specified cost, and when the purchase of at least one additional resource is within a specified cost, the controller is configured to order the at least one additional physical resource.

2. The system of claim 1, wherein the appliance further includes a network device, a virtual instance and a virtual network function based on the allocation need.

3. The system of claim 1 further comprising a memory, the controller being configured to store allocation data in the memory.

4. The system of claim 1, wherein the controller is in communication with at least one of a compute server, a storage server, a network route, a network switch, a network security, a network transport and a video appliance.

5. The system of claim 1, wherein the at least one data source includes a historical data source, the historical data source including at least historical performance data for the network.

6. The system of claim 1, wherein the at least one data source further comprises a customer input data store.

7. The system of claim 6, wherein the customer input data store is in communication with an input/output device associated with the controller, and wherein the customer input data store stores at least one input from the input/output device.

8. The system of claim 1, wherein when controller detects sufficient physical resources, controller determines whether sufficient virtual instances exist, wherein when controller detects sufficient virtual instances exist, controller allocates the virtual instances to meet demand, and wherein when controller detects insufficient virtual instances, controller creates additional virtual instances.

9. A network device in a network, the network device comprising: a processor, an input/output device coupled to the processor, and a memory coupled with the processor, the memory comprising executable instructions that when executed by the processor cause the processor to effectuate operations comprising:
 generating a controller in communication with at least one layer of the network, linking the controller to at least one data source, wherein the data source provides at least real time performance data for the network;
 detecting current network capacity and current network usage from the performance data;
 comparing current network capacity and current network usage to determine an allocation need;
 automatically adding or removing an appliance, the appliance includes a physical resource, wherein the physical resource is hardware supporting the network;
  wherein the controller is configured to communicate with a network resources layer to determine when sufficient physical resources exist in the network resource layer; and
  when the controller detects insufficient physical resources, the controller determines whether existing physical resources can be used to meet demand, and when the controller determines that existing physical resources can be used, the controller activates at least one of the existing physical resources to meet demand;
  when the controller determines that the existing physical resources cannot be used to address the allocation need, the controller is configured to access the at least one data source and determine whether sufficient space is allocated in a data center associated with the network to add at least one additional physical resource; and
  wherein the controller is configured to access the at least one data source to determine that a purchase of at least one additional resource is within a specified cost, and when the purchase of at least one additional resource is within a specified cost, the controller is configured to order the at least one additional physical resource.

10. The network device of claim 9, wherein the appliance further includes at least one of a network device, a virtual instance, and a virtual network function on the network based on the allocation need.

11. The network device of claim 9, wherein before or during the step of automatically adding or removing, the controller is configured to communicate with a network resources layer to determine if sufficient physical resources exist in the network resource layer, wherein if the controller detects sufficient physical resources, the controller determines whether sufficient virtual instances exist, wherein if the controller detects sufficient virtual instances exist, the controller allocates at least one of the virtual instances to address the allocation need, and wherein if the controller detects insufficient virtual instances, the controller creates at least one additional virtual instance based on the allocation need.

12. The network device of claim 10, wherein the controller creates the at least one additional virtual instance mirroring at least one existing virtual instance.

13. The network device of claim 9, wherein the processor further effectuates operations comprising before the step of adding or removing, sending a prompt to the input/output device including the proposed allocation and a request for confirmation of the allocation, and performing the adding or removing step only after the input/output device returns a confirmation of the allocation.

14. The network device of claim 9, wherein the processor further effectuates operations comprising linking the controller to at least one of a compute server, a storage server, a network route, a network switch, a network security, a network transport and a video appliance.

* * * * *